United States Patent
Nemiroff et al.

(10) Patent No.: US 9,367,328 B2
(45) Date of Patent: Jun. 14, 2016

(54) OUT-OF-BAND HOST OS BOOT SEQUENCE VERIFICATION

(75) Inventors: Daniel Nemiroff, Folsom, CA (US); Paul J. Thadikaran, Rancho Cordova, CA (US); Andrew H. Gafken, Folsom, CA (US); Purushottam Goel, Beaverton, OR (US); Nicholas D. Triantafillou, Portland, OR (US); Paritosh Saxena, Portland, OR (US); Debra Cablao, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/536,859

(22) Filed: Jun. 28, 2012

(65) Prior Publication Data

US 2014/0006760 A1 Jan. 2, 2014

(51) Int. Cl.
| | |
|---|---|
| *G06F 11/30* | (2006.01) |
| *G06F 9/44* | (2006.01) |
| *G06F 21/55* | (2013.01) |
| *G06F 21/57* | (2013.01) |
| *H04L 9/32* | (2006.01) |

(52) U.S. Cl.
CPC ............ *G06F 9/4401* (2013.01); *G06F 21/554* (2013.01); *G06F 21/575* (2013.01); *H04L 9/3247* (2013.01)

(58) Field of Classification Search
CPC ............................... G06F 21/56; G06F 21/563
USPC .......................................................... 713/187
See application file for complete search history.

(56) References Cited

U.S. PATENT DOCUMENTS

| | | | |
|---|---|---|---|
| 7,603,713 B1 * | 10/2009 | Belov | 726/24 |
| 7,657,941 B1 | 2/2010 | Zaitsev | |
| 7,854,008 B1 * | 12/2010 | Huang et al. | 726/24 |
| 7,940,932 B2 * | 5/2011 | Paksoy et al. | 380/247 |
| 8,225,404 B2 * | 7/2012 | Freericks et al. | 726/24 |
| 8,234,697 B2 * | 7/2012 | Chhabra | 726/6 |
| 8,285,987 B1 * | 10/2012 | Kimball et al. | 713/164 |
| 2007/0094654 A1 * | 4/2007 | Costea | 717/168 |
| 2008/0163212 A1 * | 7/2008 | Zimmer et al. | 718/100 |
| 2009/0013165 A1 * | 1/2009 | Chow et al. | 713/2 |
| 2009/0187991 A1 * | 7/2009 | Freericks et al. | 726/24 |
| 2011/0289306 A1 * | 11/2011 | Khosravi et al. | 713/2 |

OTHER PUBLICATIONS

Halfacree, G.,"Kaspersky patents hardware-based AV" <http://www.bit-tech.net/news/hardware/2010102/19/kaspersky-patents-hardware-av/1> [retrieved Jun. 10, 2015 9:38:09 AM], 5 pages.

* cited by examiner

*Primary Examiner* — Mohammad W Reza (74) *Attorney, Agent, or Firm* — Schwabe, Williamson & Wyatt, P.C.

(57) ABSTRACT

Embodiments of techniques and systems for out-of-band verification of host OS components are described. In embodiments, a out-of-band host OS boot sequence verification system ("BSVS") may access system memory without detection by a host OS process, or "out of band." The BSVS may access host OS components in the system memory and may generate signatures from memory footprints of the host OS components. These signatures may then be compared to trusted signatures to verify integrity of the host OS components. In embodiments, this verification may be performed during a boot of a host OS or on demand. In embodiments, the trusted signatures may be pre-stored by the BSVS before a boot; in some embodiments, the trusted signatures may be previously-computed and then stored by the BSVS. Other embodiments may be described and claimed.

27 Claims, 7 Drawing Sheets

OUT-OF-BAND HOST OS BOOT SEQUENCE VERIFICATION

BACKGROUND

Viruses, worms, and other malware continue to create problems for users of computing devices. Various systems and devices may utilize anti-virus software to protect against infection by identifying and removing viruses. However, many viruses may thwart this protection by modifying files in a host operating system ("host OS") to prevent detection by the anti-virus software. For example, a virus may infect a boot manager for the host OS. The virus, either by itself or through the infected boot manager, may modify other host OS files that are utilized during detection of viruses. If the virus modifies the host OS files to intercept requests that are used by anti-virus software, the virus may then modify these requests and thus prevent the detection.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As may be used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
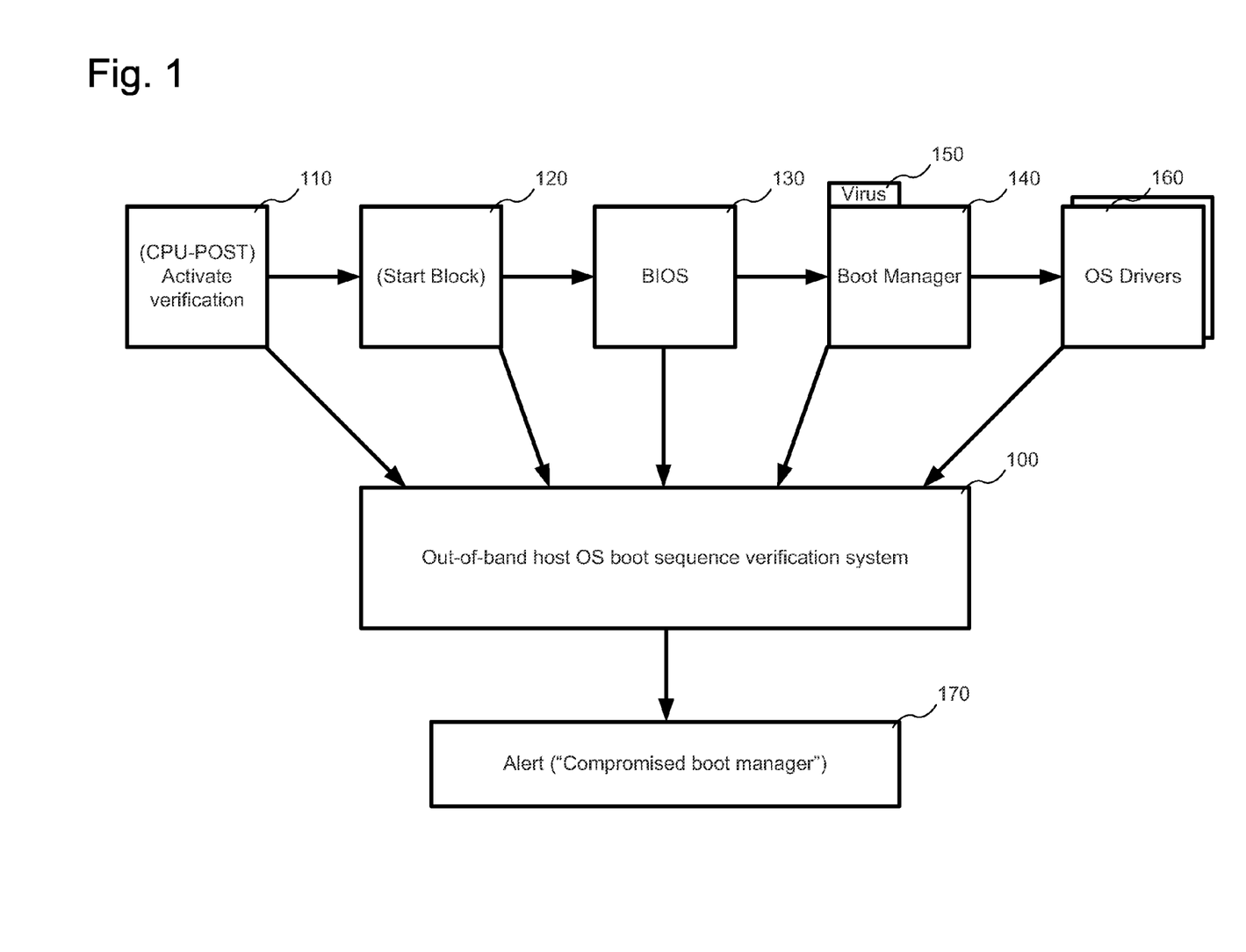
FIG. 1 is a block diagram illustrating an example out-of-band host OS boot sequence verification system, in accordance with various embodiments.

Referring now to FIG. 1, an out-of-band host OS boot sequence verification system 100 ("BSVS 100") is illustrated. In various embodiments, the BSVS 100 may be configured to access and verify the integrity of one or more components of a host OS executing on a computing device. For example, and as illustrated in the example of FIG. 1, the BSVS 100 may be configured to access and verify integrity of a BIOS 130, a boot manager 140, and/or one or more OS drivers 160. In various embodiments, the BSVS 100 may perform such verification during, for example, a boot of the host OS; in other embodiments, the verification may be performed on demand. In various embodiments, the BSVS 100 may be configured to access the components directly in a system memory without intervention by, or even knowledge of, the host OS or any host processors the host OS is executing on. This action outside of the attention of the host OS and host processors may be referred to as acting "out of band."

In various embodiments, the BSVS 100 may be configured to generate an alert 170 if a component of the host OS is found to be compromised. Thus, in the example illustrated in FIG. 1, where the boot manager 140 has been compromised by a virus 150, the BSVS 100 may generate an alert 170 that the boot manager is compromised. In various embodiments, the BSVS 100 may be configured to display the alert 170 to a user of the computing device. In other embodiments, the BSVS 100 may be configured to send an alert 170 remotely, such as, for example, to a user on a remote computing device. In various embodiments, in addition to sending the alert 170, the BSVS 100 may be configured to perform other actions in response to determining that a host OS component is corrupt. For example, in various embodiments, the BSVS 100 may be configured to interrupt a boot process of the host OS and/or begin a cleaning process, such as using an anti-virus application.

In various embodiments, the BSVS 100 may interact with various components and actions during a boot process of the host OS. Thus the BSVS 100 may receive a command to be activated during a boot process. For example, and as illustrated in FIG. 1, during a power on self text process of a central processing unit ("CPU-POST"), a CPU may send a command to the BSVS 100 to activate verification of host OS components. Next, a start block 120 of the boot process may be loaded by an OS loader. In various embodiments, the start block 120 may determine settings prior to BIOS start and may send a notification to the BSVS 100 that the host OS boot process has started. The BSVS 100 may then be configured to access various components of the host OS during the boot process. Thus, for example, the BSVS 100 may access the BIOS 130, the boot manager 140 and/or the OS drivers 160. In various embodiments, the BSVS 100 may be configured to perform this access by accessing the components in memory once they are loaded during the boot of the host OS. Thus, the BSVS 100 may obtain a memory footprint for one or more of the BIOS 130, the boot manager 140 and/or the OS drivers 160. The BSVS 100 may then generate signatures, or other identifiers, from the memory footprint, and may compare these to trusted signatures. This comparison may, in various embodiments, allow the BSVS 100 to determine if the components are compromised or not, and thus whether to generate an alert.

Figure 2:
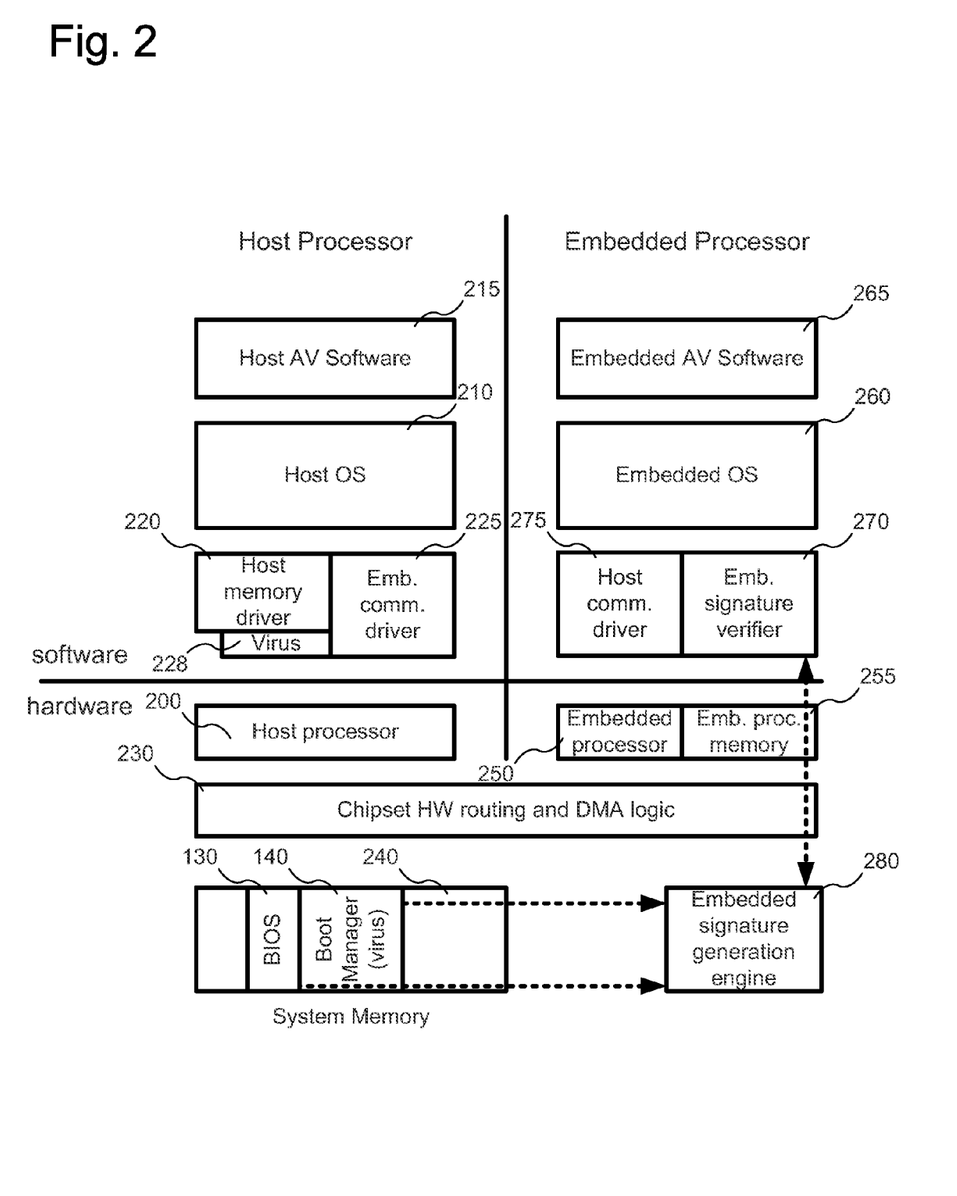
FIG. 2 illustrates example components of the out-of-band host OS boot sequence verification system, in accordance with various embodiments.

FIG. 2 illustrates example components of the BSVS 100, in accordance with various embodiments. FIG. 2 illustrates various components included in and/or executing on a host processor 200 and an embedded processor 250. In various embodiments, the host processor 200 may include a CPU. As FIG. 2 illustrates, in various embodiments, one or more components may be executed in software on the host processor 200 or embedded processor 250. Additionally, one or more hardware components may be found either in or coupled to the host processor 200 or embedded processor 250, while some components may be accessible to both. In various embodiments, illustrated components may include components of the BSVS 100, such as the embedded signature verifier 270 and/or embedded signature generation engine 280, as described herein. In various embodiments, the host processor 200 and embedded processor 250 may be in separate packages or may be contained in a single package. In some embodiments, the embedded processor may be located on a card on a PCI express bus; in other embodiments, the embedded processor may be located on another hardware device coupled to a motherboard that can allow for direct memory access, such as, for example, a network device. In various embodiments, the embedded processor 250 may be resident in a platform control hub, a system on a chip, a multi-chip package, and/or a chipset that manages I/O interfaces for the host processor.

In various embodiments, the embedded processor 250 may be associated with embedded memory 225 which may not be accessible to the host processor 200. Additionally, in various embodiments, a system memory 240 may be accessible by both the host processor 200 and the embedded processor 250. In various embodiments, the embedded processor 250 may be configured to access system memory 240 without detection of the host processor 200 or host OS 210, such as through the chipset hardware routing and direct memory access logic 230.

In various embodiments, each of the host processor 200 and the embedded processor 250 may execute operating systems in software (e.g. the host OS 210 and the embedded OS 260, respectively). In various embodiments, the host OS 210 may include one or more of components that may be loaded during a boot of the host OS 210, such as the BIOS 130, the boot manager 140 and/or the OS drivers 160.

In various embodiments, anti-virus software, such as host anti-virus software 215 and/or embedded anti-virus software 265, may execute on one of the host OS 210 or embedded OS 260. In various embodiments, the BSVS 100 may, after detection of a compromised host OS component, interact with one of the host anti-virus software 215 and/or embedded anti-virus software 265 to clean or quarantine the component. In various embodiments, the embedded anti-virus software 265 may be utilized for this cleaning purpose if it is believed that the host OS 210 (and therefore the host anti-virus software 215) is too compromised to trust that the cleaning/quarantining can be effective.

In various embodiments, both the host processor and the embedded processor may have one or more drivers to allow for communication outside of the processor. For example, the host processor may execute to host memory driver 220 to provide for communication with system memory 240. In various embodiments, however, the host memory driver 220 may be compromised by a virus 228. As described above, the virus 228 may, through compromising the host memory driver 220, intercept and control accesses to the system memory 240. This may prevent software, such as the host anti-virus software 215, from properly recognizing the presence of a virus in the system memory. Thus, if the boot manager 140 is compromised with the virus, the host anti-virus software 215 may be unable to detect the virus and may not identify the compromised nature of the boot manager 140. In various embodiments, the host processor 200 and embedded processor 250 may also execute communication drivers for communication with each other. For example, the host processor 200 may execute an embedded communication driver 225 and the embedded processor 250 may execute a host communication driver 275. In various embodiments, communications between the host processor 200 and embedded processor 250 may be facilitated through chipset hardware routing and direct memory access logic 230.

In some embodiments, the embedded processor 250 may access one or more components in the system memory 240 using the embedded signature verifier 270. In various embodiments, the embedded signature verifier 270 may communicate with an hardware-based embedded signature generation engine 280 accessible by the embedded processor 250. In various embodiments, the embedded signature verifier 270 may be configured to execute to cause the embedded signature generation engine 280 to access one or more host OS components in the system memory 240. In some embodiments, the embedded signature generation engine 280 may be configured to access a memory footprint of one or more components. In various embodiments, the embedded signature generation engine 280 may be configured to access the memory out-of-band, as described herein.

The embedded signature verifier 270 may be further configured to cause the embedded signature generation engine 280 to generate a signature from the accessed components and to return that generated signature to the embedded signature verifier 270. In various embodiments, the embedded signature generation engine 280 may be configured to perform one or more cryptographic hashes to generate the signature such as, but not limited to, for example, the SHA-256 hash function. The embedded signature verifier 270 may then compare the generated signatures to trusted signatures for the components in order to determine if the components may have been compromised.

Figure 3:
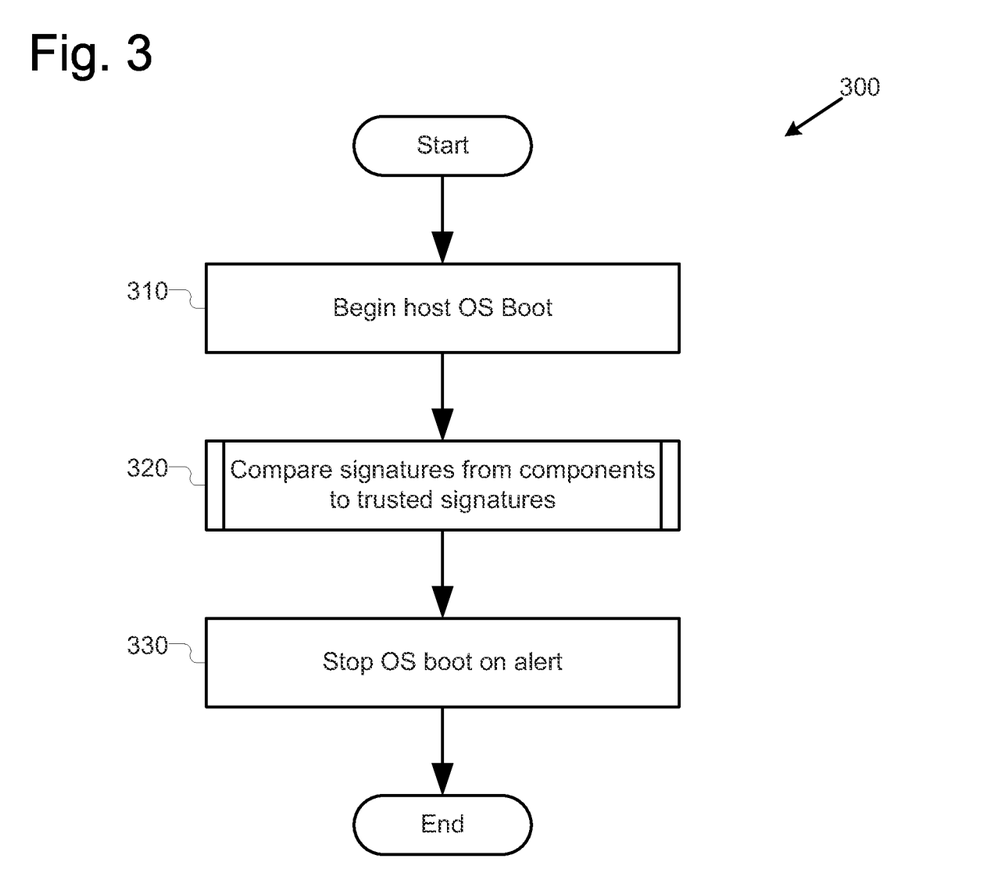
FIG. 3 illustrates an example out-of-band host OS boot sequence verification process of the host OS boot sequence verification system, in accordance with various embodiments.

FIG. 3 illustrates an example out-of-band host OS boot verification process 300 of the host OS boot sequence verification system, in accordance with various embodiments. It may be recognized that, while the operations of process 300 are arranged in a particular order and illustrated once each, in various embodiments, one or more of the operations may be repeated, omitted, or performed out of order. The process may begin at operation 310, where the host OS 210 may begin a boot process. Next, at operation 320, the embedded signature verifier 270 of the embedded processor 250 may compare one or more signatures from host OS components to trusted signatures. Particular embodiments of operation 320 are described below with reference to process 400 of FIG. 4. Next, at operation 330, if an alert is received based on the comparing, the OS boot process may be stopped. The process may then end.

Figure 4:
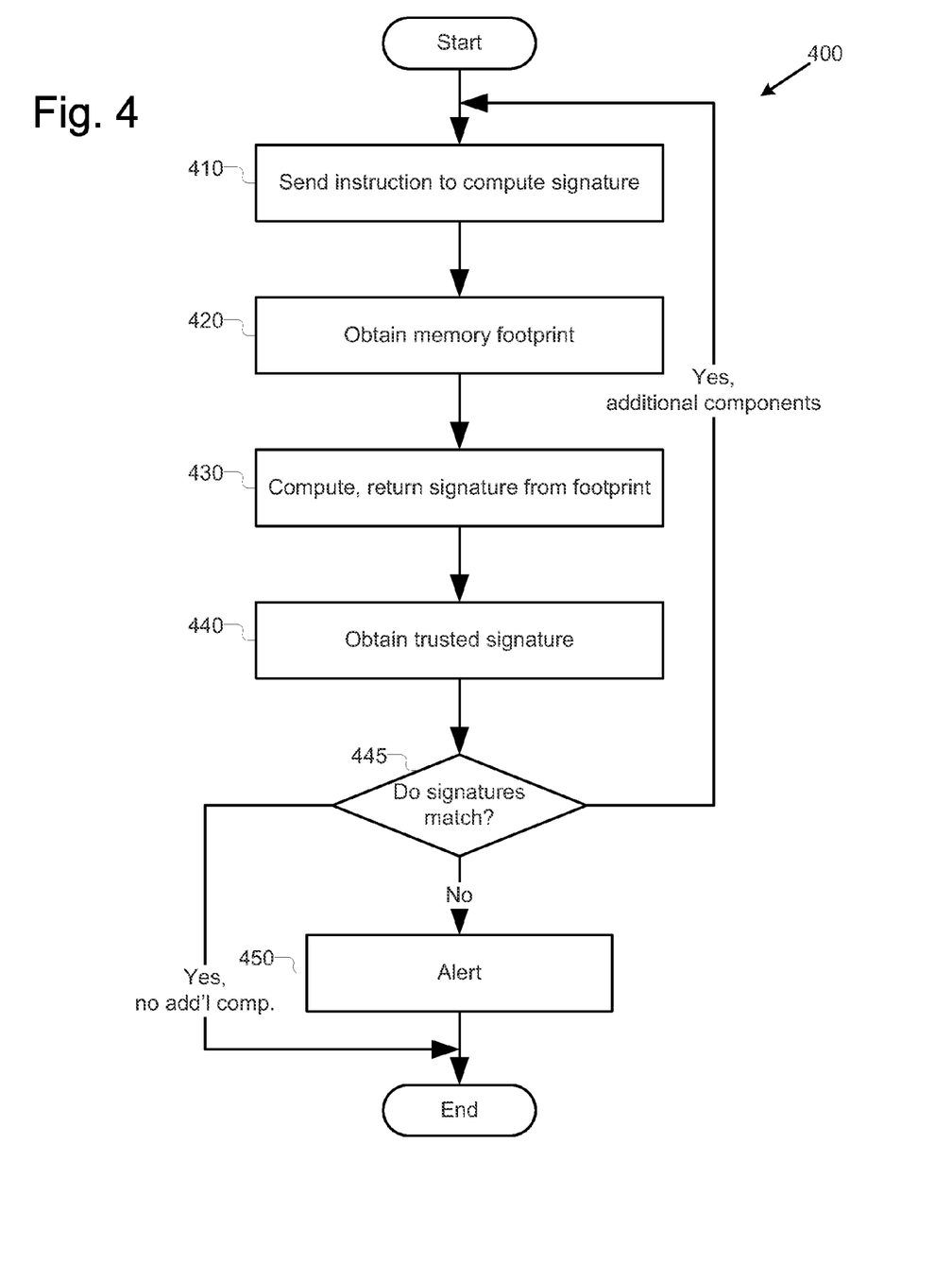
FIG. 4 illustrates an example out-of-band host OS component verification process of the out-of-band host OS boot sequence verification system, in accordance with various embodiments.

FIG. 4 illustrates an example out-of-band host OS component verification process of the out-of-band host OS boot sequence verification system, in accordance with various embodiments. In various embodiments, process 400 may include one or more embodiments of operation 320 of process 300. It may be recognized that, while the operations of process 400 are arranged in a particular order and illustrated once each, in various embodiments, one or more of the operations may be repeated, omitted, or performed out of order. The process may begin at operation 410, where the embedded signature verifier 270 may send an instruction to generate a signature to the embedded signature generation engine 280. In various embodiments, the instruction may include an indication of a component for which the embedded signature generation engine 280 should generate a signature.

Next, at operation 420, the embedded signature generation engine 280 may obtain a memory footprint for the host OS component for which it will generate the signature. Then at operation 430, the embedded signature generation engine 280 may generate a signature from the memory footprint of the component to the embedded signature verifier 270. At operation 430 the embedded signature generation engine 280 may also provide the generated signature to the embedded signature verifier 270. In various embodiments, the embedded signature generation engine 280 may generate the signature by performing a cryptographic hash function on all or part of the memory footprint.

Next, at operation 440, the embedded signature verifier 270 may obtain a trusted signature. As discussed herein, in various embodiments, the embedded signature verifier 270 may obtain the trusted signature as a pre-stored trusted signature. For example, in some embodiments, the embedded signature verifier 270 may obtain the trusted signature from a trusted signature stored on the computing device before any boot of the host OS, such as in the embedded memory 255. Thus, in some such embodiments, the computing device may be pre-loaded with one or more trusted signatures for comparison, each of which is assumed to represent the memory footprint of a host OS component in an uncompromised state. By checking against these known trusted signatures, the embedded signature verifier 270 may be able to verify the integrity of the host OS components during boot (or at another time).

In other embodiments, the embedded signature verifier 270 may obtain the trusted signature from a signature previously stored on the device by the embedded signature verifier 270 during operation of the computing device. Thus, in some embodiments, the embedded signature verifier 270 may utilize previously-generated signatures to compare against, allowing the embedded signature verifier 270 to confirm that host OS components have not been modified since a previous point in time when the previously-generated signatures were generated. Particular examples of these embodiments are described below. In other implementations, the obtained trusted signatures may be obtained from other sources, such as from other computing devices. In some such embodiments, the trusted signatures may be sent to the computing device before or along with an instruction to perform a host OS boot sequence verification as described herein.

Next, at decision operation 445, the embedded signature verifier 270 may determine if the signature generated at operation 430 matches the signature obtained at operation 440. If not, then at operation 450 the embedded signature verifier 270 may generate an alert, such as alert 170. In some embodiments, release of the alert may lead to cessation of a host OS boot process, as described above. If, however, the signatures match, then if additional components may be verified, the process may repeat at operation 410. If, however, no additional host OS components may be verified, then the process may end.

Figure 5:
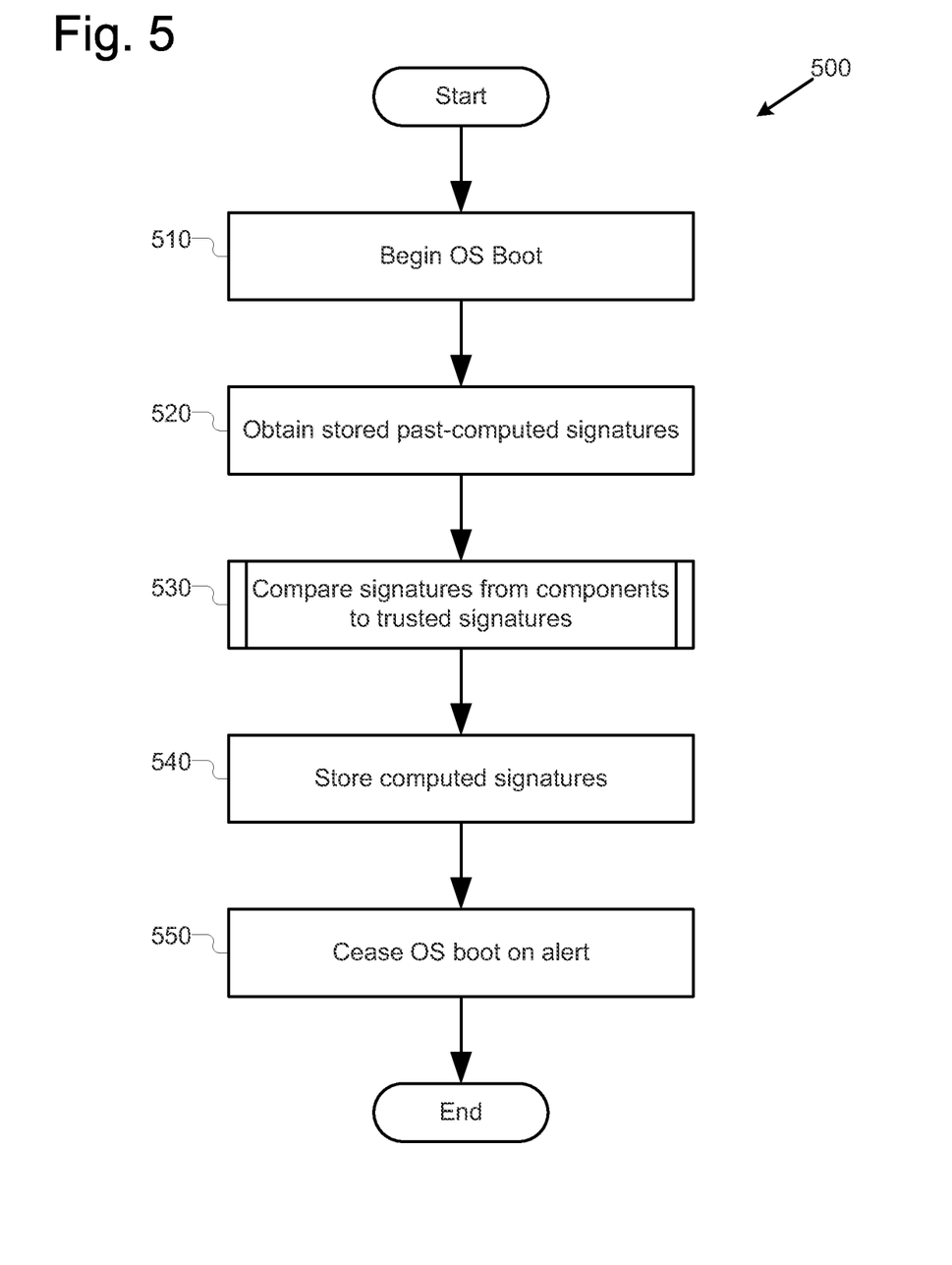
FIG. 5 illustrates an example time-based out-of-band host OS boot sequence verification process of the host OS boot sequence verification system, in accordance with various embodiments.

FIG. 5 illustrates an example time-based out-of-band host OS boot sequence verification process 500 of the host OS boot sequence verification system, in accordance with various embodiments. It may be recognized that, while the operations of process 500 are arranged in a particular order and illustrated once each, in various embodiments, one or more of the operations may be repeated, omitted, or performed out of order. It may be recognized that aspects of process 500 may be similar to aspects of process 300 of FIG. 3. However, in various embodiments, process 500 may be performed to verify one or more host OS components against prior-generated and -stored host OS component signatures. By comparing signatures against previously-generated signatures, the embedded signature verifier 270 may be able to determine if any of the host OS components have been modified and/or compromised since the last signature generation.

The process may begin at operation 510, where the host OS 210 may begin a boot process. Next, at operation 520, the embedded signature verifier 270 may obtain stored previously-generated signatures. In various embodiments, these signatures may be obtained from signatures stored by the embedded processor 250, such as in the embedded processor memory 255. In other embodiments, the signatures may be stored elsewhere, such as on a storage device.

Next, at operation 530, the embedded signature verifier 270 of the embedded processor 250 may compare one or more signatures from host OS components to trusted signatures. Particular embodiments of operation 530 are described above with reference to process 400 of FIG. 4. Then at operation 540, the embedded signature verifier 270 may store the generated signatures for use in later verification of host OS components. Next, at operation 550, if an alert is received based on the comparing, the OS boot process may be stopped. The process may then end.

Figure 6:
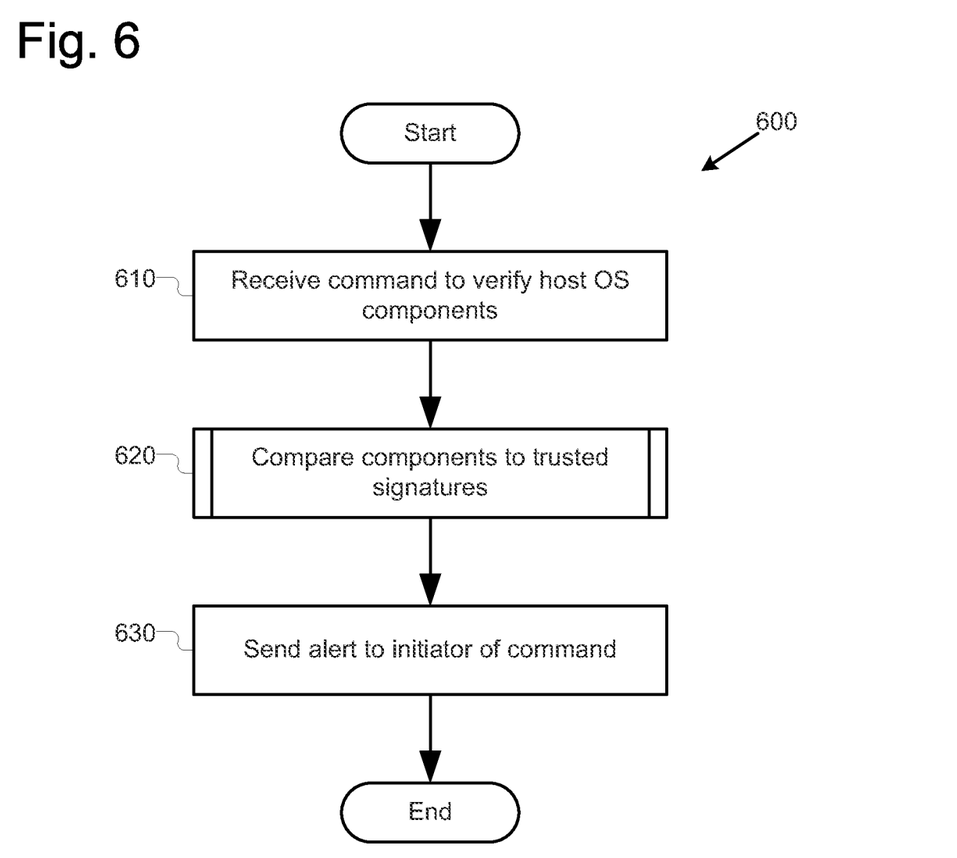
FIG. 6 illustrates an example on-demand out-of-band OS boot sequence verification process of the out-of-band host OS boot sequence verification system, in accordance with various embodiments.

FIG. 6 illustrates an example out-of-band on-demand OS boot sequence verification process 600 of the out-of-band host OS boot sequence verification system, in accordance with various embodiments. It may be recognized that, while the operations of process 600 are arranged in a particular order and illustrated once each, in various embodiments, one or more of the operations may be repeated, omitted, or performed out of order. It may be recognized that aspects of process 600 may be similar to aspects of process 300 of FIG. 3. However, in various embodiments, process 600 may be performed to perform verification of host OS components on demand, rather than only at boot time. The process may begin at operation 610, where the embedded signature verifier 270 may receive a command to verify host OS components. In various embodiments, the command may be received from a trusted agent operating in the host OS such as, for example, the host OS anti-virus software 215. In other embodiments, a user, either located locally or remotely from the computing device, may initiate the command. Thus, in some embodiments, the command may be received over a network. In various embodiments the embedded processor 250 may be configured to receive one or more network commands to perform the host OS boot sequence verification techniques described herein. In various embodiments, the embedded processor 250 may be configured to receive the one or more network commands out-of-band of the host processor 200.

Next, at operation 620, the embedded signature verifier 270 of the embedded processor 250 may compare one or more signatures from host OS components to trusted signatures. Particular embodiments of operation 620 are described above with reference to process 400 of FIG. 4. Next, at operation 630, if an alert is received based on the comparing, the alert may be sent to the initiator of the command received at operation 610. Thus, in some embodiments, the alert may be sent to a trusted agent operating in the host OS. In other embodiments, an alert message may be sent over a network to a user initiating the command. The process may then end.

Figure 7:
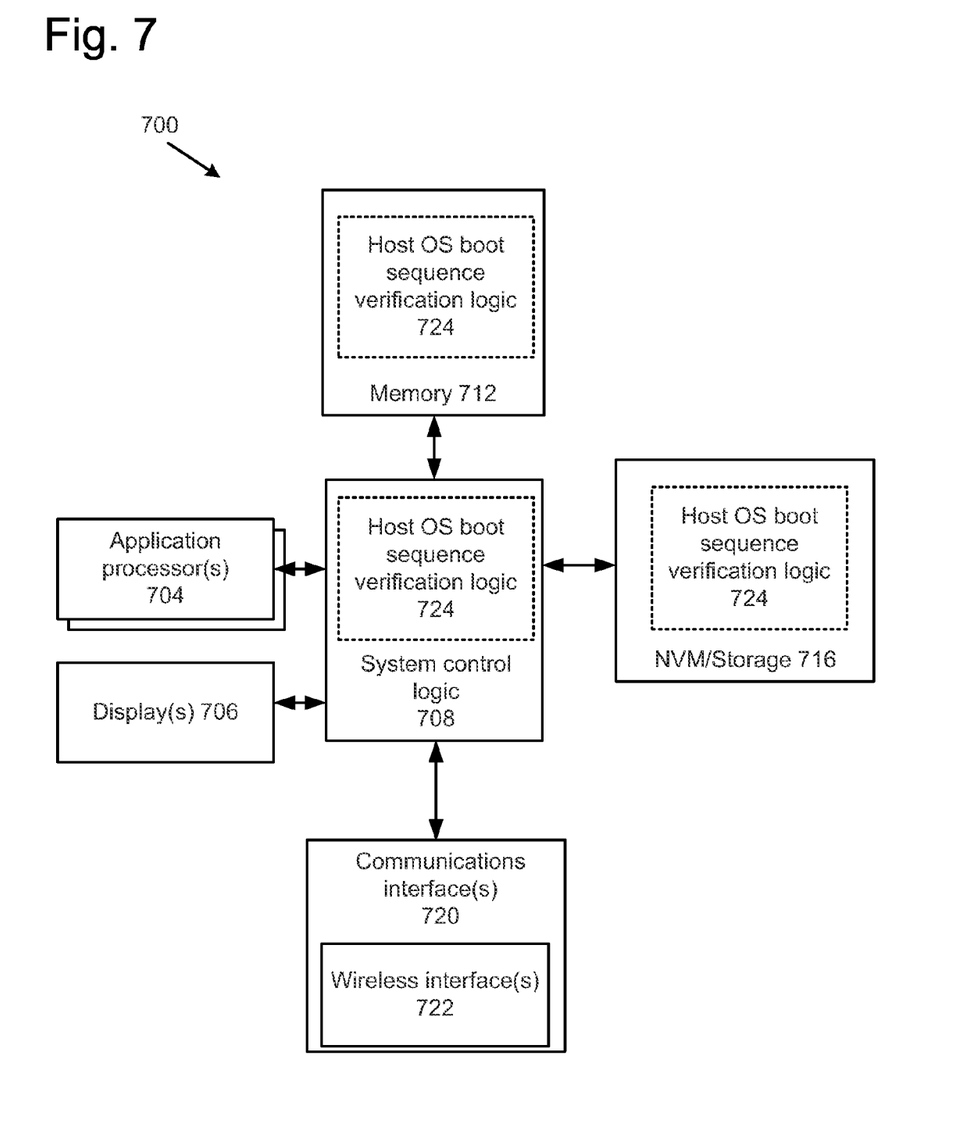
FIG. 7 illustrates an example computing environment suitable for practicing the disclosed embodiments, in accordance with various embodiments.

FIG. 7 illustrates, for one embodiment, an example computer system 700 suitable for practicing embodiments of the present disclosure. As illustrated, example computer system 700 may include control logic 708 coupled to at least one of the processor(s) 704, system memory 712 coupled to system control logic 708, non-volatile memory (NVM)/storage 716 coupled to system control logic 708, and one or more communications interface(s) 720 coupled to system control logic 708. In various embodiments, the one or more processors 704 may be a processor core.

System control logic 708 for one embodiment may include any suitable interface controllers to provide for any suitable interface to at least one of the processor(s) 704 and/or to any suitable device or component in communication with system control logic 708. System control logic 708 may also interoperate with a display 706 for display of information, such as to as user. In various embodiments, the display may include one of various display formats and forms, such as, for example, liquid-crystal displays, cathode-ray tube displays, and e-ink displays. In various embodiments, the display may include a touch screen.

System control logic 708 for one embodiment may include one or more memory controller(s) to provide an interface to system memory 712. System memory 712 may be used to load and store data and/or instructions, for example, for system 700. In one embodiment, system memory 712 may include any suitable volatile memory, such as suitable dynamic random access memory ("DRAM"), for example.

System control logic 708, in one embodiment, may include one or more input/output ("I/O") controller(s) to provide an interface to NVM/storage 716 and communications interface(s) 720.

NVM/storage 716 may be used to store data and/or instructions, for example. NVM/storage 716 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 716 may include a storage resource physically part of a device on which the system 700 is installed or it may be accessible by, but not necessarily a part of, the device. For example, the NVM/storage 716 may be accessed over a network via the communications interface(s) 720.

System memory 712, NVM/storage 716, and system control logic 708 may include, in particular, temporal and persistent copies of host OS boot sequence verification logic 724. The host OS boot sequence verification logic 724 may include instructions that when executed by at least one of the processor(s) 704 result in the system 700 practicing one or more of the protected memory management operations described above.

Communications interface(s) 720 may provide an interface for system 700 to communicate over one or more network(s) and/or with any other suitable device. Communications interface(s) 720 may include any suitable hardware and/or firmware, such as a network adapter, one or more antennas, a wireless interface 722, and so forth. In various embodiments, communication interface(s) 720 may include an interface for system 700 to use NFC, optical communications (e.g., barcodes), BlueTooth or other similar technologies to communicate directly (e.g., without an intermediary) with another device. In various embodiments, the wireless interface 722 may interoperate with radio communications technologies such as, for example, WCDMA, GSM, LTE, and the like.

For one embodiment, at least one of the processor(s) 704 may be packaged together with system control logic 708 and/or host OS boot sequence verification logic 724. For one embodiment, at least one of the processor(s) 704 may be packaged together with system control logic 708 and/or host OS boot sequence verification logic 724 to form a System in Package ("SiP"). For one embodiment, at least one of the processor(s) 704 may be integrated on the same die with system control logic 708 and/or host OS boot sequence verification logic 724. For one embodiment, at least one of the processor(s) 704 may be integrated on the same die with system control logic 708 and/or host OS boot sequence verification logic 724 to form a System on Chip ("SoC").

Computer-readable media (including non-transitory computer-readable media), methods, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The invention claimed is:

1. A system for verifying a host operating system, the system comprising:
   computer system memory;
   a first computer processor, separate but coupled with the computer system memory to operate out-of-band of the host operating system, which is to be executed on a second computer processor, wherein the first computer processor is an embedded processor co-located with the second computer processor on a computing platform, and the first computer processor is to:
   access one or more components of the host operating system in the computer system memory during a boot of the host operating system;
   generate one or more signatures for the accessed one or more components; and
   compare the one or more generated signatures to one or more trusted signatures.

2. The system of claim 1, wherein the first computer processor is to access the computer system memory without detection by the second computer processor.

3. The system of claim 1, wherein the first computer processor comprises a signature generation engine to access the one or more components and generate the one or more signatures.

4. The system of claim 3, wherein the signature generation engine executes in hardware.

5. The system of claim 4, wherein the first computer processor is to execute a signature verifier in software to compare the one or more generated signatures.

6. The system of claim 1, wherein the one or more trusted signatures comprise one or more signatures known to the first computer processor prior to a first boot of the host operating system on the second computer processor.

7. The system of claim 1, wherein the one or more trusted signatures comprise first one or more trusted signatures, and the first computer processor is to store the one or more generated signatures as second one or more trusted signatures.

8. The system of claim 7, wherein the first computer processor is further, during a subsequent boot of the host operating system, to repeat the access, generate, and compare with respect to the second one or more trusted signatures.

9. The system of claim 1, wherein the first computer processor is further to receive a command to perform the access, generate, and compare.

10. The system of claim 8, wherein the first computer processor is to receive the command from a trusted agent executing in the host operating system.

11. The system of claim 9, wherein the first computer processor is to receive the command via a network connection.

12. The system of claim 1, wherein the first computer processor is further to generate an alert if one or more of the generated signatures does not match one or more associated trusted signatures.

13. The system of claim 1, further comprising the second computer processor.

14. A computer-implemented method for verifying a host operating system operating on a first computer processor, the method comprising:
  accessing, by a second computer processor, one or more components of the host operating system in a computer system memory during a boot of the host operating system, separate from at least the second computer processor, without detection by the host operating system;
  generating, by the second computer processor, one or more signatures for the accessed one or more components; and
  comparing, by the second computer processor, the one or more generated signatures to one or more trusted signatures, wherein the second computer processor is an embedded processor co-located with the first computer processor on a computing platform.

15. The method of claim 14, wherein generating the one or more signatures comprises generating the one or more signatures by a signature generation engine of the second computer processor.

16. The method of claim 15, wherein accessing the one or more components comprises accessing the one or more components by the signature generation engine.

17. The method of claim 14, wherein the one or more trusted signatures comprise one or more signatures known to the second computer processor prior to a first boot of the host operating system on the first computer processor.

18. The method of claim 14, wherein:
  the one or more trusted signatures comprise first one or more trusted signatures, and
  the method further comprises storing the one or more generated signatures as second one or more trusted signatures.

19. The method of claim 18, wherein the method further comprise repeating the accessing, generating, and comparing, during a subsequent boot of the host operating system, with respect to the second one or more trusted signatures.

20. The method of claim 14, further comprising receiving a command to perform the accessing, generating, and comparing.

21. The method of claim 14, further comprising generating an alert if one or more of the generated signatures does not match one or more associated trusted signatures.

22. An embedded processor circuitry to verify a host operating system operating on a host central processing unit executing a host operating system, the embedded processor circuitry to operate to:
  access one or more components of the host operating system in a computer system memory during a boot of the host operating system, separate from the embedded processor circuitry, without detection by any processes executing on the host central processing unit;
  generate one or more signatures for the accessed one or more components; and
  compare the one or more generated signatures to one or more trusted signatures,
  wherein the embedded processor circuitry is to be co-located with the host central processing unit on a computing platform.

23. The embedded processor circuitry of claim 22, wherein the embedded processor circuitry comprises a signatures generation engine to access the one or more components and generate the one or more signatures.

24. The embedded processor circuitry of claim 22, wherein the embedded processor circuitry is to compare the one or more generated signatures to one or more trusted signatures known to the embedded processor circuitry prior to a first boot of the host operating system.

25. The embedded processor circuitry of claim 22, wherein:
  the one or more trusted signatures comprise first one or more trusted signatures, and
  the embedded processor circuitry is further to store the one or more generated signatures as second one or more trusted signatures.

26. The embedded processor circuitry of claim 22, wherein the embedded processor circuitry is further to receive a command to perform the access, generate, and compare.

27. The embedded processor circuitry of claim 22, wherein the embedded processor circuitry is further to generate an alert if one or more of the generated signatures does not match one or more associated trusted signatures.

* * * * *